Oct. 27, 1959  H. R. PICHLER  2,910,433
OIL REFINING WITH HYDROGEN
Filed Sept. 23, 1954
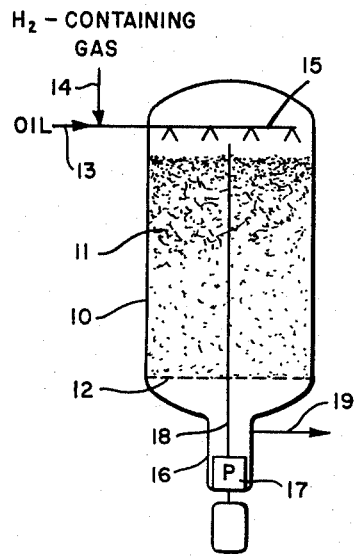
FIG.1
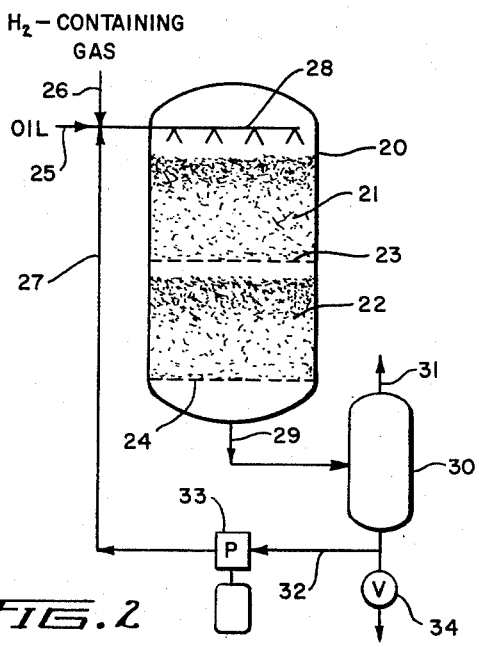
FIG.2
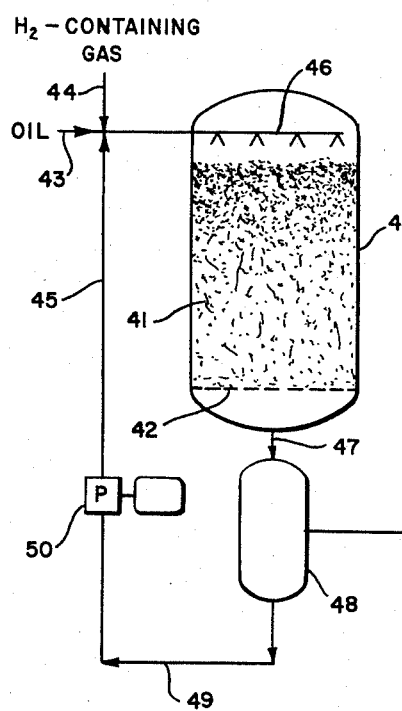
FIG.3
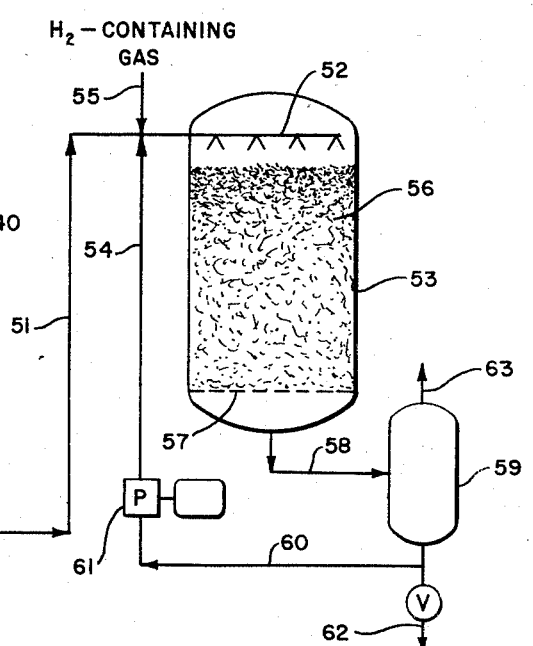
INVENTOR.
HELMUT R. PICHLER
BY Paul W. Garbo
AGENT

United States Patent Office 2,910,433
Patented Oct. 27, 1959

2,910,433

OIL REFINING WITH HYDROGEN

Helmut R. Pichler, Trenton, N.J., assignor to Hydrocarbon Research, Inc., New York, N.Y., a corporation of New Jersey Application September 23, 1954, Serial No. 457,839

14 Claims. (Cl. 208—216)

This invention relates to the treatment of hydrocarbon oils with hydrogen in the presence of catalysts. More particularly, the invention is concerned with the treatment of hydrocarbon oils to effect desulfurization, stabilization and like refinement of the treated oils.

Hydrogenation has long been used in the refinement of hydrocarbon oils and is a highly developed art insofar as the catalysts, temperatures, pressures and other process variables are concerned to effect desulfurization, color and storage stability, and other improvements in the physical and chemical properties of the treated oils. In spite of the extensive advances which have been made in the hydrogenation of hydrocarbons, one troublesome and costly problem encountered in catalytic hydrogenation has received inadequate attention. That problem is the matter of regenerating hydrogenation catalysts to maintain them at high levels of activity. It is well known that hydrogenation catalysts tend to become rapidly fouled with carbonaceous deposits and other contaminants in the charge stock, so that the activity of the catalyst can be maintained only by frequent regeneration of the catalyst. Frequent regeneration of the catalyst necessitates interruption of the hydrogenation process or, as is more frequently the case, the provision of duplicate reactors so that while one reactor is on stream for the hydrogenation of the charge stock, the other reactor is undergoing regeneration of the catalyst. Catalyst regeneration materially adds to the cost of hydrogenating hydrocarbons not only because of the capital cost of providing duplicate reactors with a double inventory of expensive catalyst, but also because of the inherently high operating costs involved in the operation of such a system.

The first significant step in the direction of extending the on-stream period in the hydrogenation of hydrocarbon oils is found in Hoog Patent U.S. 2,608,521. Hoog recognized the great need of avoiding frequent regenerations of the hydrogenation catalyst and proposed a system wherein through carefully controlled process conditions a substantial portion of the hydrocarbon oil charged to the reactor remains in the liquid phase and as such trickles downwardly through a bed of the catalyst granules while hydrogen is also passed downwardly through the catalyst bed and thus contacts the oil flowing over the surfaces of the catalyst granules. By maintaining a flowing film of the charge stock over the catalyst granules, Hoog was able to wash the catalyst continuously and to prevent the rapid accumulation of gums and other oil contaminants on the catalyst. It was thus found that the hydrogenation could be continued for several hundred hours without need of regenerating the catalyst.

The progress made by Hoog was at the cost of several process limitations. Hoog requires an unusually tall reactor having a ratio of height to diameter of at least 5:1 and once a reactor has been designed for the hydrogenation of a given hydrocarbon fraction it is difficult to use the same reactor on another hydrocarbon fraction of substantially different boiling range from that of the fraction for which the reactor was designed. This design inflexibility arises from the fact that the proportion of a charge stock which remains liquid under any selected set of reaction conditions varies with the distillation curve of each charge stock so that in some cases the liquid phase will tend to flood the catalyst bed while in other cases it may be insufficient to wash the catalyst. The seriousness of thi limitation is realized when it is noted that Hoog worked with reactors having a height-to-diameter ratio of 70; such reactors are not only inflexible with respect to operation with hydrocarbon fractions of different boiling ranges but also are costly to erect and maintain.

A principal object of this invention is to provide a hydrogenation process for hydrocarbon oils in which the catalyst will require regeneration only after extended periods of operation.

A further object is to provide a process that is highly flexible in the treatment of hydrocarbon fractions of different boiling ranges.

Another important object is to hydrogenate selectively the portions of the charge stock requiring deeper and/or more extensive treatment than the other portions of the charge stock.

These and other objects and advantages of the invention will be apparent from the description which follows.

In accordance with this invention, a hydrocarbon oil boiling essentially above the gasoline range is treated with hydrogen by passing the charge stock and a hydrogen-containing gas downwardly through a bed of particulate catalyst along with a substantial recycle stream of treated oil at least of the order of 1 volume of recycle liquid per volume of charge stock. The selection of the catalyst and such process conditions as temperature, pressure and space velocity will depend, as is known, on the character of the charge stock and the nature of the refining operation, e.g., stabilization against color bodies and gum formers, desulfurization and cetane number improvement.

The gist of the invention is the continuous washing of the catalyst bed with a recycle stream of the treated oil. The recycle stream achieves several things simultaneously. In the first place, the continuous washing of the catalyst bed with treated or refined oil maintains the catalyst in a state of high activity over very long periods of operation; in many instances, the catalyst is used continuously for at least 2 or 3 months before undergoing regeneration. Another important point achieved with the recycle oil stream is simpler and more uniform temperature control throughout the catalyst bed since the substantial flow of liquid over the catalyst surfaces tends to even out the reaction temperature. This feature is closely related to still another valuable advantage, namely, avoidance of the high preheat temperatures for the charge stocks heretofore employed to supply heat to the reaction zones. Frequently, hydrocarbon oils, particularly fractions obtained from cracked stocks, contain an appreciable proportion of diolefins and other gum-forming compounds which are converted to gums when the oils are heated to temperatures in excess of about 500° F. These gums deposit on the heat exchange surfaces of the preheaters as well as on the catalyst particles, necessitating frequent shut-downs of the hydrogenation plant for the removal of the gum deposits from the preheaters and for regeneration of the catalyst mass. The present invention now makes it possible to preheat the charge stock to such moderate temperatures, generally of the order of 500° F., at which no gum deposition takes place and to make up the heat requirements of the hydrogenation system by higher preheats of the treated and stabilized recycle oil.

Additionally, a serious problem encountered in prior hydrogenation work has been localized or uneven reaction in the catalyst bed, particularly in the vicinity where the charge stock or fresh feed with its relatively high content of sulfur and/or gum-forming compounds initially contacts the catalyst. By admixing the fresh feed with a substantial proportion of treated recycle oil, preferably at least 2 volumes of recycle oil per volume of fresh feed, the concentration of the reactive contaminants in the total oil stream entering the reactor is obviously lower than in the charge stock by itself and this materially helps in preventing localized, excessive reaction in the catalyst bed.

Some of the undesirable constituents in hydrocarbon oils, particularly the refractory sulfur compounds like thiophenes found in oils obtained in severe cracking operations, require prolonged exposure to hydrogenation conditions before they can be destroyed or eliminated. The recycling of treated oil in accordance with this invention provides a simple and effective method of achieving selective hydrogenation of the more refractory contaminants in the charge stock. Recycle rates of 4 and 5 volumes of treated oil for each volume of fresh feed may be readily resorted to where the fresh feed has a high content of thiophenic and like cyclic sulfur compounds and it is desired to eliminate 80% or more of the sulfur content. It has been observed that generally the more refractory contaminants are more prevalent in the higher boiling portion of the oil undergoing treatment. Accordingly, it is advisable in many cases to use only the higher boiling portion of the treated oil as the recycle stream and thus achieve greater desulfurization or other refinement of the charge stock.

The hydrocarbon fractions which can be processed in accordance with this invention are middle distillates and higher boiling oils including still bottoms or residues. Middle distillates may be defined as hydrocarbon fractions boiling predominantly in the temperature range of 400 to 650° F., i.e., not more than about 10% by volume boiling at temperatures below 400° F. and not more than about 10% by volume boiling at temperatures above 650° F.

The usual objectives of treating middle distillates with hydrogen is to eliminate color and gum-forming bodies as well as sulfur compounds. In some instances, it is also desirable to increase the cetane number of the fraction. The present process is well suited for achieving these objectives including increases in cetane number of the order of 10 or more points without materially changing the boiling range of the charge stock.

On the other hand, heavy oils such as still residues are generally treated with hydrogen, not only to eliminate undesirable contaminants like sulfur compounds but also to convert a substantial portion of the hydrocarbons to more volatile products. Thus, a residuum boiling essentially above 650° F. may be refined with respect to sulfur and gum content and simultaneously converted to lower boiling products including 10 to 20% by volume of gasoline and an approximately equal or higher proportion of middle distillate.

As previously mentioned, those skilled in the hydrogenation art are well aware of the process conditions which should be selected in refining any given oil. However, it may be pointed out that satisfactory results are generally obtained when the process of this invention is operated at a temperature in the range of about 650 to 850° F. and with a pressure in the range of about 500 to 3000 pounds per square inch gauge (p.s.i.g.). With middle distillates requiring desulfurization and stabilization against color and gum-forming bodies, a temperature in the range of about 675 to 750° F. and a pressure not exceeding about 750 p.s.i.g. are usually preferred. However, where it is also desired to increase materially the cetane number of a middle distillate, a pressure of the order of 1500 p.s.i.g. and higher may be advisable. In the case of heavy oils like still residues, the hydrogenation temperature is in most cases above 700° F. and preferably in the range of about 750 to 800° F. while the pressure is preferably maintained in the range of 1000 to 2000 p.s.i.g. The space velocity in terms of the fresh feed alone is generally of the order of 1 liquid volume per hour per volume of catalyst and higher. In the case of a heavy oil which is to be hydrogenated to produce a substantial quantity of gasoline and middle distillate, the space velocity of the charge stock may be decreased to as low as about 0.5 volume of liquid per hour per volume of catalyst in the reactor. With most middle distillates, a fresh feed space velocity of 2 to 3 liquid volumes per hour per volume of catalyst may be maintained with satisfactory results.

The hydrogen which is supplied to the reaction system is usually in the form of a gaseous stream containing other constituents such as carbon oxides, nitrogen, methane, ethane and steam. The rate of introduction of the hydrogen-containing gas into the reactor is adjusted to provide usually at least 125 cubic feet (standard conditions) of hydrogen for each barrel of total oil (fresh feed plus recycle) entering the reactor. A hydrogen rate in the range of about 250 to 500 cubic feet per barrel of total oil is preferred in the treatment of middle distillates not requiring any substantial increase in the cetane number. Where middle distillates are hydrogenated to increase the cetane number by 10 or more points, a higher hydrogen flow rate up to about 1000 cubic feet per barrel of total oil charged to the reactor may be advisable. In the hydrogenation of heavy oils, a hydrogen flow rate below about 500 cubic feet per barrel of total oil is generally adequate and when a very high oil recycle ratio, say more than 6 volumes of treated oil per volume of charged heavy oil, is employed the hydrogen rate may fall below about 200 cubic feet per barrel of total oil.

As already indicated, the oil recycle ratio is usually not less than about 1 volume of treated oil per volume of fresh feed. Higher recycle ratios are frequently preferred for a variety of reasons. For instance, a highly cracked middle distillate having a high content of diolefins and other gum-forming compounds is desirably diluted with 2 to 3 volumes of treated oil before entering the catalyst bed in order to inhibit the deposition of gums and like carbonaceous materials on the catalyst surfaces. A middle distillate of high sulfur content may well justify an oil recycle ratio of 4 to 6 volumes of treated oil per volume of fresh feed so that deep desulfurization, say 80% or more, may be achieved. With heavy oils which are hydrogenated to eliminate sulfur and other contaminants and simultaneously yield appreciable quantities of gasoline and middle distillate, it is advisable to use recycle oil ratios in excess of 6:1.

In view of the substantial quantity of treated oil which is recycled to the catalyst bed in accordance with this invention, it is well to note that in large commercial-scale plants the particulate catalyst is disposed in the form of a single bed or a series of spaced beds having an overall ratio of height to diameter not exceeding about 4 to 1. For instance, the catalyst may be disposed in a single bed measuring 26 feet in depth and 7 feet in diameter (H/D ratio of 3.7). As another example, the catalyst may be arranged in 3 spaced beds, each measuring 9 feet in height and 7 feet in diameter (overall H/D ratio 3.9). The reactor is generally designed to provide one or more catalyst beds having an overall ratio of height to diameter (H/D) in the range of about 3.5 to 4.

With the substantial rate at which treated oil is recycled to the reactor, there is always liquid phase trickling down over the catalyst surfaces, frequently at a flow rate of at least 10 gallons per minute per square foot of horizontal cross section of the catalyst bed. Liquid flow rates in excess of 25 gallons per minute per square foot of horizontal cross section are usually avoided to prevent excessive pressure drop in the gases flowing through the catalyst bed.

Any sulf-active hydrogenation catalyst may be used in the process of this invention. Among the more prominent catalysts which may be used in treating hydrocarbon oils with hydrogen are cobalt molybdate deposited on alumina, tungsten sulfide and the mixed oxides of iron and chromium.

To facilitate understanding of the present invention further, reference is now made to the accompanying drawings which diagrammatically represent typical flowsheets embodying the oil recycle feature of the invention.

Figure 1 illustrates a reactor 10 in which a bed 11 of particulate catalyst is disposed on a perforated plate 12. The charge stock is supplied to reactor 10 by way of line 13 into which hydrogen-containing gas is introduced from line 14. The mixture of fresh feed oil and hydrogen-containing gas is uniformly supplied over the horizontal cross-sectional area of reactor 10 through a distributor 15. The liquid and gaseous reactants may obviously be preheated to any desired temperature before entering reactor 10. The mixed reactants flow down through catalyst bed 11 and the liquid phase which trickles down over the catalyst particles is supplemented by recycling treated oil which collects in sump 16 at the bottom of reactor 10 and is recycled therefrom by sump pump 17 and standpipe 18 to the top of catalyst bed 11. Line 19 is used for the withdrawal of the gaseous reaction products and liquid products in excess of the quantity which is desired for recycle purposes. The advantage of the simple layout shown in Figure 1 is that by recycling treated oil internally with respect to reactor 10, the recycle stream is not exposed to external cooling and, therefore, heat leaks from the reaction system are minimized.

Figure 2 shows a reactor 20 in which two catalyst beds 21 and 22 are disposed in series and supported, respectively, by perforated plates 23 and 24, and by having two such catalyst beds in lieu of one deeper bed, the flow of the reactants uniformly over the entire horizontal cross-section of the reactor is insured because perforated plate 23 acts like a flow distributor or equalizer to lower catalyst bed 22. The charge stock flowing through line 25 is admixed with hydrogen-containing gas entering by way of line 26 and a stream of treated oil which is recycled by way of line 27. These combined streams are uniformly supplied to reactor 20 through distributor 28 and flow down in succession through catalyst beds 21 and 22. The reaction effluent leaves reactor 20 through line 29 and discharges into separator 30 in which a liquid phase collects in the lower portion thereof and from which a gaseous phase is withdrawn by way of line 31. The stream of treated oil which is recycled to the top of reactor 20 by way of line 27 is drawn from separator 30 through line 32 by pump 33. The treated oil which collects in separator 30 in excess of the desired recycling quantity is withdrawn through valved line 34.

Figure 3 presents a two-stage operation embodying the recycle principle of this invention. The first-stage reactor 40 contains a catalyst bed 41 supported by perforated plate 42 and receives the fresh feed supplied by line 43. The fresh feed is joined by hydrogen-containing gas from line 44 and treated recycle oil from line 45. The mixture of liquid and gaseous reactants enters reactor 40 through distributor 46. The reaction products discharge from reactor 40 through line 47 into separator 48. The liquid phase collecting at the bottom of separator 48 is withdrawn through line 49 by pump 50 which supplies the recycle stream in line 45. The gaseous effluent from reactor 40, along with excess liquid in separator 48, passes through line 51 and distributor 52 into second-stage reactor 53. The reaction products of the first stage flowing by way of line 51 to reactor 53 are supplemented by a stream of treated recycle oil from line 54. As desired, additional hydrogen-containing gas may also be introduced to reactor 53 from line 55. The reactants pass down through catalyst bed 56 and perforated plate 57 and discharge from reactor 53 through line 58 into separator 59. A liquid phase collects at the bottom of separator 59 and is withdrawn through line 60 by pump 61 to provide the recycle stream in line 54. The treated oil in excess of the recycle requirements is withdrawn from separator 59 through valved line 62 while the gaseous phase of the reaction effluent leaves separator 59 through line 63.

In connection with Figure 2, it may be noted that by withdrawing the reaction effluent from reactor 20 through line 29 the liquid phase which is used for recycle purposes may be fractionated to provide only a higher-boiling fraction as the recycle stream. Also, since the recycle stream is external to reactor 20, this stream may be put through any desired preheater to supply the heat requirements in reactor 20 and, thus, minimize the amount of preheat given to the charge stock which may form gum deposits if preheated to the temperature required in reactor 20.

The schematic flow of Figure 3 offers considerable flexibility in the manner in which the recycle principle may be used. Thus, the quantity of recycle oil may be different in the first- and second-stage reactors, the temperature in each reactor may be individually controlled by the amount of preheat given to the recycle stream to each of the reactors, and the rate at which hydrogen is supplied to each of the reactors may be independently controlled.

It is to be noted that the reaction effluents in line 19 of Figure 1, in lines 31 and 34 of Figure 2 and in lines 62 and 63 of Figure 3 will be sent to conventional recovery plants wherein these streams will be processed to separate the normally gaseous components from the normally liquid components and the latter will be fractionated into desired hydrocarbon products. The gaseous fraction which is separated from the reaction effluent in these recovery plants contains considerable hydrogen and may be treated by any of the known methods, such as scrubbing with absorbent liquids to remove undesirable components like hydrogen sulfide, in order to purify and concentrate the hydrogen-containing gas and thus make it more suitable for recycling to the reactor. In most instances, the hydrogen-containing gas supplied in line 14 of Figure 1, in line 26 of Figure 2 and in lines 44 and 55 of Figure 3 will in substantial part be made up of hydrogen-containing gas recovered from the reaction effluent of the same reactor to which the gas is supplied. Of course, in each instance, make-up hydrogen must be provided from any suitable source to compensate for the hydrogen which is consumed in the reaction system. In the case of Figure 3, it is possible to separate the gaseous phase reaching separator 48 and to treat this gaseous phase to provide the hydrogen which is recycled to line 44, while a separate recycle of hydrogen to line 55 is obtained from the gas leaving separator 59 by way of line 63. Another obvious control which is afforded by the two-stage operation of Figure 3 is the different character of the recycle oils to reactors 40 and 53.

To illustrate the invention further, seven specific examples are presented in Table 1. In all of these examples except Example 3, the catalyst was cobalt molybdate on alumina granules (4 to 8 mesh size). The catalyst of Example 3 was a co-precipitated mixture of iron and chromium oxides (3Fe:1Cr). The catalyst in the first-stage reactor of Example 6 had previously been in service more than 1000 hours as the catalyst of the second-stage reactor; in other words, fresh catalyst is introduced into the second stage and, after more than 1000 hours of operation, this catalyst is used as the first-stage catalyst without undergoing regeneration. In the last two lines of Table 1 it is readily seen that the fresh feed was in every example materially improved in terms of

Table 1

| Example | 1 | 2 | 3 | 4 | 5 | 6 | 7 |
|---|---|---|---|---|---|---|---|
| Fresh feed | MD-1 | MD-1 | MD-2 | LR-1 | LR-1 | LR-1 | SR-1 |
| Purpose of treatment | (1) | (1) | (2) | (3) | (3) | (3) | (3) |
| Reaction temperature, °F | 675 | 700 | 800 | 770 | 770 | 800 A / 800 B | 830 |
| Reaction pressure, p.s.i.g | 750 | 500 | 1,000 | 1,500 | 1,500 | 1,500 A / 1,500 B | 3,000 |
| Fresh feed space velocity, v./hr./v | 3 | 3 | 2 | 1 | 0.54 | 1 A / 1 B | 1 |
| Oil recycle ratio | 4 | 2 | 2 | 4 | 7.8 | 10 A / 10 B | 20 |
| H₂ flow rate, C.F./bbl. total oil | 300 | 250 | 500 | 300 | 166 | 136 A / 136 B | 143 |
| Liquid phase flow, G.P.M./sq. ft | 13 | 7.5 | 2 | 4 | 4.3 | 10.2 A / 10.0 B | 20 |
| Sulfur in fresh feed, weight percent | 0.95 | 0.95 | 1.0 | 4.1 | 4.1 | 4.1 | 5.4 |
| Sulfur in product, weight percent | 0.049 | 0.10 | 0.46 | 1.8 | 1.3 | 1.4 A / 0.5 B | 0.6 |

1 Desulfurization.  2 Stabilization.  3 Hydro-treating.

NOTE.—A—First-stage reactor; B—Second-stage reactor.

desulfurization, even in Example 3 where the process conditions were selected primarily to stabilize the middle distillate used as charge stock.

The fresh feed of Examples 1 and 2 was the same middle distillate (MD-1) and the upgrading of this oil in each case is brought out in Table 2.

Table 2

| | Fresh feed (MD-1) | Example 1 product | Example 2 product |
|---|---|---|---|
| Gravity, °API | 30.2 | 32.9 | 32.2 |
| ASTM distillate, °F.: | | | |
| 10 vol. percent | 480 | 460 | 466 |
| 50 vol. percent | 524 | 514 | 518 |
| 90 vol. percent | 586 | 580 | 580 |
| Aniline point, °F | 129.0 | 131.0 | 130.0 |
| Bromine number, cgs./gm | 10.5 | 5.1 | 5.9 |
| Diesel index | 39.2 | 43.1 | 42.0 |

The stabilization improvement of another middle distillate (MD-2) by the treatment of Example 3 is evident from the data in Table 3.

Table 3

| | Fresh feed (MD-2) | Example 3 product |
|---|---|---|
| Gravity, °API | 30.1 | 32.2 |
| ASTM distillate, °F.: | | |
| 10 vol. percent | 480 | 448 |
| 50 vol. percent | 522 | 516 |
| 90 vol. percent | 584 | 582 |
| Aniline points, °F | 127 | 125 |
| Bromine number, cgs./gm | 9.9 | 7.8 |
| Diesel index | 38.2 | 40.2 |
| ASTM color (D155-45T): | | |
| Original | 1.5+ | 1.5+ |
| After 24 hrs. at 212°F | 4 | 2— |
| Sediment after 24 hrs. at 212°F., mg./l | 24 | 0.6 |

A 47% Kuwait residuum (LR-1) was used as charge stock in Examples 4, 5 and 6, and the improvement effected by the treatments of these examples may be readily seen in Table 4.

Table 4

| | Fresh feed (LR-1) | Example 4 product | Example 5 product | Example 6 product |
|---|---|---|---|---|
| Gravity, °API | 15.7 | 25.3 | 29.0 | 30.5 |
| Distillate, vol. percent: | | | | |
| 400°F | 0 | 12.6 | 18.0 | |
| 400–650°F | 2 | 16.0 | 20.3 | |
| 650–900°F | 39 | 38.4 | 39.2 | |
| 900°F | 59 | 33.0 | 22.5 | |

It is interesting to note that the oil product obtained from the second-stage reactor of Example 6 had a gravity of 30.5° API while the oil product from the first-stage reactor had a gravity of 27.0° API and contained 1.4% by weight of sulfur.

In contrast to the long residuum treated in Examples 4, 5 and 6, a shorter (19%) Kuwait residumm (SR-1) was upgraded by the treatment of Example 7. Thus, the fresh feed with a gravity of 8.2° API and a sulfur content of 5.4% by weight yielded an oil with a gravity of 29.0° API and a sulfur content of 0.6% by weight.

The oil recycling process of this invention has made continuous and smooth operation possible over very long periods without encountering difficulties from the plugging of the catalyst bed by gum deposits or from the loss of catalyst activity. Liquid product yields of substantially 100% by volume have been obtained and even better yields have been attained in the case of hydrogenating heavy oils, e.g., liquid yields of 102% by volume in Examples 4 and 5.

Confirmation of the tendency of refractory sulfur compounds to persist in the higher-boiling hydrocarbon fractions is found in the following data on the liquid product fractions of Example 5.

| Distillation range | Sulfur content, percent by weight |
|---|---|
| To 400°F | 0.062 |
| 400–650°F | 0.22 |
| 650–900°F | 0.78 |
| Above 900°F | 2.81 |

Such data often justify the recycling of only the higher-boiling fractions of the treated oil to the hydrogenation reactor.

Very small quantities of mercaptans in middle distillates are often objectionable. The middle distillate treated in Example 1 originally had a mercaptan sulfur content of 0.005% by weight but this was substantially decreased to 0.0007% by weight in the treated oil.

In considering a possible explanation of the reaction mechanism by which the oil recycle principle of this invention achieves superior results, it may be well to observe that hydrogen is soluble in liquid hydrocarbons and that recycled oil containing dissolved hydrogen may afford a better opportunity to supply abundant hydrogen to the catalyst surfaces than merely introducing the fresh feed and hydrogen-containing gas into the reactor.

In view of the various modifications of the invention which will occur to those skilled in the art upon consideration of the foregoing disclosure without departing from the spirit or scope thereof, only such limitations should be imposed as are indicated by the appended claims.

What is claimed is:

1. A catalytic process for treating a sulfur-containing hydrocarbon oil boiling essentially above 400°F. with hydrogen, which comprises passing a feed mixture of said sulfur-containing oil, recycled treated oil and hydrogen downwardly through a reaction zone containing a bed of particulate sulf-active hydrogenation catalyst and maintained at a temperature in the range of about 650 to 850° F. and at a pressure in the range of about 500 to 3000 p.s.i.g. so that at least part of the oil in said mixture remains in the liquid phase and trickles down over the surfaces of said particulate catalyst in said bed, and recycling at least about 2 volumes of treated oil for admixture with each volume of said sulfur-containing oil passed through said reaction zone.

2. The process of claim 1 wherein the hydrocarbon oil is a middle distillate.

3. The process of claim 2 wherein the particulate catalyst is cobalt molybdate deposited on alumina.

4. The process of claim 3 wherein the liquid phase trickles down through the bed of particulate catalyst at a rate in the range of about 10 to 25 gallons per minute per square foot of horizontal cross section of said bed.

5. The process of claim 1 wherein the hydrocarbon oil boils essentially above about 650° F. and the recycle stream amounts to at least about 6 volumes per volume of said hydrocarbon oil charged to the reaction zone.

6. The process of claim 5 wherein the particulate catalyst is cobalt molybdate deposited on alumina.

7. The process of claim 1 wherein the hydrocarbon oil is a middle distillate and the hydrogen is supplied to the reaction zone at a rate in the range of about 250 to 500 cubic feet per barrel of said middle distillate and the oil recycled to the catalyst bed.

8. The process of claim 1 wherein the hydrocarbon oil boils essentially above about 650° F. and the hydrogen is supplied to the reaction zone at a rate in the range of about 125 to 200 cubic feet per barrel of said hydrocarbon oil and the oil recycled to the catalyst bed.

9. The process of claim 8 wherein the oil recycled to the catalyst bed is stripped of hydrocarbons boiling below about 650° F. prior to its flow through said catalyst bed.

10. A catalytic process for treating a sulfur-containing hydrocarbon oil boiling essentially above 400° F. with hydrogen in contact with multiple beds of particulate sulf-active hydrogenation catalyst, which comprises passing a feed mixture of said sulfur-containing oil, recycled treated oil and hydrogen downwardly in succession through said multiple beds at a temperature in the range of about 650 to 850° F. and at a pressure in the range of about 500 to 3000 p.s.i.g. so that at least part of the oil in said mixture remains in the liquid phase and trickles down over the surfaces of said particulate catalyst in said multiple beds, and recycling at least about 2 volumes of treated oil for admixture with each volume of said sulfur-containing oil passed through said multiple beds.

11. The process of claim 10 wherein treated oil is recycled separately to each of the multiple beds.

12. The process of claim 10 wherein hydrogen is introduced into one of said multiple beds subsequent to the first.

13. A catalytic process for treating a sulfur-containing heavy hydrocarbon oil boiling essentially above about 650° F. with hydrogen, which comprises passing a feed mixture of said sulfur-containing oil, recycled treated oil and up to about 200 standard cubic feet of hydrogen per barrel of said sulfur-containing oil and recycled treated oil through a reaction zone containing a bed of particulate sulf-active hydrogenation catalyst and maintained at a temperature in the range of about 650 to 850° F. and at a pressure in the range of about 500 to 3000 p.s.i.g. so that at least part of the oil in said mixture remains in the liquid phase, and recycling at least about 6 volumes of treated oil for admixture with each volume of said sulfur-containing oil passed through said reaction zone.

14. The process of claim 13 wherein the particulate catalyst is cobalt molybdate deposited on alumina.

References Cited in the file of this patent

UNITED STATES PATENTS

| | | |
|---|---|---|
| 2,332,572 | Hepp | Oct. 26, 1943 |
| 2,376,086 | Reid | May 15, 1945 |
| 2,392,579 | Cole | Jan. 8, 1946 |
| 2,419,029 | Oberfell | Apr. 15, 1947 |
| 2,587,987 | Franklin | Mar. 4, 1952 |
| 2,608,521 | Hoog | Aug. 26, 1952 |
| 2,627,495 | Lanning | Feb. 3, 1953 |

FOREIGN PATENTS

| | | |
|---|---|---|
| 517,221 | Belgium | Feb. 14, 1953 |